3,348,080
IMPULSE GENERATOR
Clair K. Lair, Pomona, Calif., assignor to General Dynamics Corporation, Pomona, Calif., a corporation of Delaware
Filed June 7, 1965, Ser. No. 461,862
16 Claims. (Cl. 310—29)

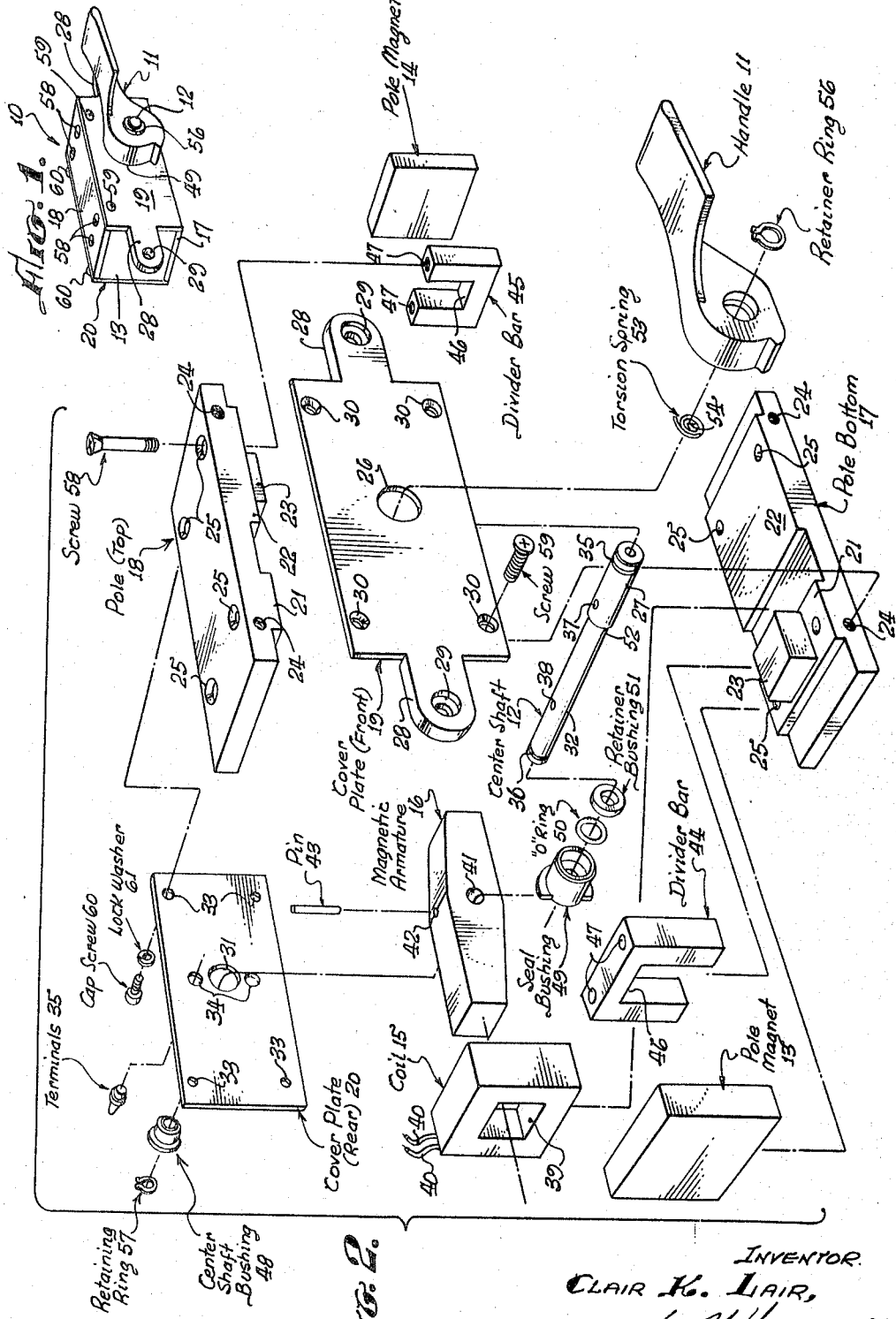

ABSTRACT OF THE DISCLOSURE

Broadly, the disclosure relates to a hand operated, high current, magneto pulse generator which utilizes two permanent magnets and a zero airgap armature. More specifically, the magnetic armature is pivotally mounted within a fixed coil and is held by magnetic attraction in contact with the north pole of one magnet at one extremity and the south pole of the second magnet at the other. As the armature is rotated through a small arc by the snap action resulting from application of force to a torsion spring by means of a manipulated lever, the rapid change in flux within the magnetic armature which results from the rotation of the extremities of the armature away from contact with the magnet is sensed by the fixed coil. Upon release of the actuating lever, the magnetic attraction of the magnets again returns the armature to its zero airgap position.

---

This invention relates to the generation of electricity, particularly to the generation of an electric current by an electro-magnetic device, and more particularly to the generation of an electric current by the movement of an armature of magnetic material in the path of the magnetic flux of a permanent magnet.

In many instances, it is desirable to provide an electrical pulse of energy to effect various operations automatically in response to a given force. For example, it may be desirable to activate devices such as camera flash bulbs, explosive devices, or other equipment at the time of a given impact.

Therefore, it is an object of this invention to provide an impulse generator.

A further object of the invention is to provide an electrical impulse generator device which will provide a pulse of electrical energy in response to a force.

Another object of the invention is to provide an impulse generator having basically only one moving part.

Another object of the invention is to provide an impulse generator wherein the electric pulse is obtained by changing from a high flux density in the armature to a low flux density.

Another object of the invention is to provide an impulse generator which is so constructed that after each manual operation it returns automatically to initial position as soon as the force used in operating it is withdrawn.

Another object of the invention is to provide an impulse generator wherein the pulse starts when the actuating handle has been moved a predetermined number of degrees.

Other objects of the invention will become readily apparent from the following description and accompanying drawings wherein:

FIG. 1 is a perspective view of an embodiment of the invention; and

FIG. 2 is an exploded view of the FIG. 1 embodiment.

Referring now to the drawings, the embodiment of the invention as illustrated in FIGS. 1 and 2 basically comprises a housing generally indicated at 10, an actuating handle or lever 11 mounted on a center shaft 12 supported in housing 10, a pair of permanent magnets 13 and 14 positioned at each end of housing 10, a coil 15 fixed within housing 10, and a magnetic armature 16 mounted on shaft 12 and adapted to move within coil 15.

Housing 10 consists of a bottom pole plate 17, a top pole plate 18, a front cover plate 19, and a rear cover plate 20, magnets 13 and 14 serving as the ends of housing 10 as shown in FIG. 1.

Bottom pole plate 17 is configured to define raised portions 21 and 22, raised portion 21 being provided with a protruding member 23 which serves as a pole piece, portion 21 of plate 17 being smaller than portion 22. Plate 17 is provided with four (4) threaded holes 24 (only two shown) on the sides thereof while raised portions 21 and 22 are each provided with holes 25.

Top pole plate 18 is identical in configuration with bottom plate 17 except that raised portion 22 is provided with the protruding member or pole piece 23.

Front cover plate 19 is provided with a central aperture 26 through which an enlarged section 27 of shaft 12 extends, a pair of lugs 28 having apertures 29 therein, and four (4) apertures 30 adapted to align with threaded holes 24 in bottom plate 17 and top plate 18.

Rear cover plate 20 is provided with a central aperture 31 through which a reduced diameter section 32 of shaft 12 extends, four (4) apertures 33 adapted to align with threaded holes 24 in the rear side (not shown) of plates 17 and 18, and a pair of apertures 34 adapted to accept terminals 35 (only one shown).

Shaft 12 is additionally provided with a pair of grooves 35 and 36 and a pair of apertures 37 and 38, groove 35 and aperture 37 being in section 27 while groove 36 and aperture 38 are in section 32.

Coil 15 has a central opening 39 adapted to accept an end of armature 16, and a pair of leads 40 for connection with terminals 35.

The magnetic armature 16 is provided with an aperture 41 through which shaft 12 extends, and a smaller aperture 42 through which a pin 43 secures shaft 12 to armature 16 via aperture 36 in section 32 of the shaft.

A pair of divider bars 44 and 45 of generally U-shaped configuration having cut-away sections 46 and four (4) threaded holes 47 (only two holes shown on each bar) are adapted to separate plates 17 and 18. The cut-away section of bar 44 fitting over the protruding member 23 on raised portion 21 of plate 17, while section 46 of bar 45 fits over member 23 on raised portion 22 of plate 18. The cut-aways 46 are of sufficient size to allow the ends of armature 16 to move therein and serve as armature stops after the bars have been positioned over members 23 of the plates.

Magnetic armature 16 and handle 11 are mounted on housing front and rear cover plates 19 via center shaft 12. Shaft 12 is supported at section 32 by a shaft bushing 48 which fits in aperture 31 of rear cover plate 20, and supported at section 27 by a seal bushing 49 which fits in aperture 26 of front cover plate 19. An O-ring 50 fits within seal bushing 49 and is retained by a retainer bushing 51 which abutts against a shoulder 52 of shaft 12. A torsion spring 53 is positioned around section 27 of shaft 12 with one end 54 inserted in aperture 37 of the shaft and the other end 55 adapted to fit in a notch (not shown) in handle 11, whereby movement of handle 11 in a clockwise direction reduces the spring diameter and thus loads the same as will be explained hereinafter. A pair of retaining rings 56 and 57 are adapted to fit in grooves 35 and 36, respectively, of shaft 12 and against handle 11 and shaft bushing 48, respectively, for retaining the above positioned members on the shaft.

Housing bottom and top pole plates 17 and 18 are fastened together via divider bars 44 and 45 by means such as screws 58, there being eight (8) such screws required (four for each plate) but only one being shown. Screws 58 extend through apertures 25 in plates 17 and 18 into threaded holes 47 of bars 44 and 45. Housing front cover plate 19 is attached to pole plates 17 and 18 by means such as screws 59 (four required with only one shown) which extend through apertures 30 in plate 19 into threaded holes 24 in plates 17 and 18. Housing rear cover plate 20 is attached to pole plates 17 and 18 by means such as cap screws 60 and lock washers 61 (four each required with only one each shown), screws 60 extending through apertures 33 in plate 20 into threaded holes (not shown) similar to 24 in plates 17 and 18.

In view of the above description and the dash-dot and dash lines in FIG. 2, it is believed that how the various components are positioned and/or interconnected is obvious and a further description of the assembly of the components to produce the impulse generator shown in FIG. 1 is deemed unnecessary.

In operation, handle 11 is depressed (moved clockwise) which places tension on torsion spring 53 until the spring force overcomes the magnetic attraction between armature 16 and the pole pieces or protruding portions 23. At this time the armature 16 accelerates away from the pole pieces due to the rapidly diminishing magnetic force and the nearly constant spring force and moves through coil 15. The time for the armature 16 to rotate, in this embodiment, the full eleven (11) degrees, within stationary coil 15 is one (1) millisecond. Due to the rapid change in the magnetic flux path the output voltage induced in coil 15 peaks and then exhibits an R–L discharge. The armature 16 returns to the original zero airgap position against pole pieces 23 by magnetic attraction when the handle 11 is released. In the embodiment illustrated, the peak output, designed for a four (4) or five (5) ohm load is 1.6 amperes and uniform pulse shapes from operation to operation are assured by the torsion spring 53 which is rotated approximately thirty-five (35) degrees by the operating handle 11. There is an output of —.75% of the forward output energy upon release of the handle 11 due to the movement of armature 16 through coil 15.

It has thus been shown that this invention provides an impulse generator which is hand operated and capable of producing a high current pulse to activate elements such as an explosive device with the following inherent advantages: (1) reliability due to basically one moving part with no moving wire to fatigue; (2) simplicity due to no ratchets, detens, cams, etc.; (3) high energy per cubic inch; (4) no pulse delay, due to the pulse starting upon relatively small movement of the handle; and (5) production of an electric pulse by change from a high flux density in the armature to a low density without reversal of the direction of flux in the armature. In addition, due to the two pole configuration of the pivot shaft with the armature supported at approximately its center, the magnetic flux is broken at both ends of the armature at the same instant, thereby inducing a greater rate of flux change than an unsupported armature of equal cross-section, thus causing a higher voltage to be induced in the coil. Due to the torsion spring which produces a substantially constant output regardless of the actuation force on the handle, a slow actuation of the handle will result in the same pulse amplitude as with a fast handle actuation motion.

Although a specific embodiment of the invention has been illustrated and described, changes and modifications will become apparent to those skilled in the art, and it is intended to cover in the appended claims all such modifications and changes as come within the true spirit and scope of the claim.

What I claim is:

1. An impulse generator comprising, in combination: a housing, a pair of magnetic members positioned in said housing, such that one of said pair of magnetic members is positioned in each end of said housing, a stationary coil means in said housing positioned intermediate said magnetic members, an armature means within said housing, said armature means being intermediate said magnetic members and having a portion thereof movably positioned within said stationary coil means, one of said pair of magnetic members functioning as a north pole for said armature means and the other of said pair of magnetic members functioning as a south pole for said armature means, said armature means being normally held by magnetic attraction intermediate said pair of magnetic member, and means for moving said armature means with respect to said coil means and said magnetic members for inducing electrical energy in said coil means.

2. The impulse generator defined in claim 1, wherein said armature moving means includes a torsion spring means.

3. The impulse generator defined in claim 1, wherein said armature moving means includes a shaft means supported in said housing and fixedly attached to said armature means, a lever operably positioned on said shaft means, and a resilient member interconnecting said shaft means and said lever.

4. The impulse generator defined in claim 1, wherein said housing includes a plurality of removable plate-like members.

5. An impulse generator comprising a housing, a shaft extending through and supported in said housing, an armature within said housing and mounted on said shaft, a coil fixed within said housing and positioned around one end of said armature, a permanent magnet mounted at each end of said housing and positioned at each end of said armature for holding said armature by magnetic force between the ends of said armature and said magnets so that under normal conditions airgap between said coil and said armature portion is substantially zero, and handle means operatively connected to said shaft through a torsion spring, whereby movement of said handle means develops tension in said torsion spring and moves said shaft and armature when said tension is sufficient to overcome said magnetic force thus moving said armature through said coil and inducing electrical energy in said coil.

6. The impulse generator defined in claim 5, additionally including means for supporting said shaft in said housing.

7. The impulse generator defined in claim 5, wherein said housing includes a pair of removable cover plates, and additionally includes means for retaining said shaft supported in said removable cover plates.

8. An impulse generator comprising: a top member, a bottom member, each of said members being provided with a pair of raised sections, a coil having external leads and positioned intermediate said members and between said raised sections of each of said members, an armature intermediate said members and having a portion thereof extending through said coil, a pair of magnets intermediate said members and adjacent opposite ends of said armature, means for interconnecting said top and bottom members, a shaft fixedly attached to said armature, a pair of plate members, means for supporting said shaft in apertures of said plate members, means for connecting said plate members to said top and bottom members, a lever operably positioned on said shaft, resilient means connecting said lever to said shaft, and means for retaining said shaft in said apertures of said plate members.

9. The impulse generator defined in claim 8, additionally including terminal members mounted on one of said plate members and connected with said coil leads.

10. The impulse generator defined in claim 8, wherein said shaft supporting means includes a bushing member extending through each aperture of said plate members.

11. The impulse generator defined in claim 10, wherein one of said bushing means is providing with a seal which extends around said shaft, and a retainer bushing for said seal.

12. The impulse generator defined in claim 8, wherein said resilient means comprising a torsion spring having one end inserted into an aperture in said shaft and the other end operatively retained by said lever.

13. The impulse generator defined in claim 8, wherein said armature is of an elongated configuration, and said shaft extends through said armature at substantially the center thereof.

14. The impulse generator defined in claim 13, wherein said armature and said shaft are interconnected by pin-like means.

15. The impulse generator defined in claim 8, wherein one of said raised sections of each of said top and bottom members is provided with a protruding portion, and wherein said means for interconnecting said top and bottom members includes a pair of U-shaped members positioned intermediate said top and bottom members with the leg portions thereof straddling said protruding portions of said top and bottom members, said leg portions of said U-shaped members being of sufficient length to allow said ends of said armature to extend therebetween.

16. A hand operated, high current, magneto pulse generator including two permanent magnets, a magnetic armature pivotally mounted within a fixed coil and held by magnetic attraction in contact with a north pole of one of said magnets at one extremity and a south pole of the second of said magnets at the other extremity, one end of said armature being movably positioned within said fixed coil, said armature being normally positioned within said fixed coil as to provide a substantially zero airgap therebetween, means including a torsion spring and a lever for rotating said armature through a small arc by the snap action resulting from application of force to said torsion spring by manipulation of said lever, whereby a rapid change in magnetic flux within said magnetic armature results from rotation of the extremities of said armature away from contact with said magnets which induces electrical energy in said fixed coil, the magnetic attraction of said magnets causing said armature to return to its zero airgap position upon release of said lever.

References Cited

UNITED STATES PATENTS

| | | | |
|---|---|---|---|
| 1,543,480 | 6/1925 | Parks | 310—36 |
| 2,135,843 | 11/1938 | Pye | 310—36 |
| 2,491,902 | 12/1949 | Ostline | 310—15 X |
| 2,618,755 | 11/1952 | Bussey | 310—36 |

MILTON O. HIRSHFIELD, *Primary Examiner.*

D. F. DUGGAN, *Assistant Examiner.*